United States Patent [19]

Challberg et al.

[11] Patent Number: 5,624,047
[45] Date of Patent: Apr. 29, 1997

[54] TELESCOPING MAST WITH ZERO CLEARANCE FOR REFUELING MACHINE

[75] Inventors: Roy C. Challberg, Livermore; Cecil R. Jones, Saratoga, both of Calif.

[73] Assignee: General Electric Company, San Jose, Calif.

[21] Appl. No.: 428,811

[22] Filed: Apr. 24, 1995

[51] Int. Cl.$^6$ ........................................... F16C 25/02
[52] U.S. Cl. ......................... 212/350; 267/158; 384/35
[58] Field of Search .................................. 212/350, 348, 212/349, 230, 231; 384/35, 37, 42; 267/158; 403/109

[56] References Cited

U.S. PATENT DOCUMENTS

| | | | |
|---|---|---|---|
| 3,719,403 | 3/1973 | Sung | 384/35 |
| 4,016,688 | 4/1977 | Tiffin et al. | 212/350 |
| 4,168,008 | 9/1979 | Granryd | 212/350 |
| 5,465,854 | 11/1995 | Sturm et al. | 212/350 |

FOREIGN PATENT DOCUMENTS 2303644  11/1974  Germany ..................... 212/350

Primary Examiner—Thomas J. Brahan
Attorney, Agent, or Firm—James E. McGinness

[57] ABSTRACT

A telescoping mast with zero clearance which can be used in a fully automatic, relative positioning refueling machine. The telescoping mast consists of a series of nested tubes separated by spacers of unique design. Each spacer consists of an upper spacer assembly attached to the upper end of an inner tube segment nested in an outer tube segment and slidable inside the outer tube segment; and a lower spacer assembly attached to the lower end of the outer tube segment and slidable outside the inner tube segment. The spacer assemblies are preferably made of molded plastic, for example, polyethylene. Each spacer assembly is formed by a spacer ring and a plurality of corrugated members connected at one end to the spacer ring. The distal ends of the corrugated members of the upper spacer assembly contact the distal ends of respective ones of the corrugated members of the lower spacer assembly when the inner tube segment is in an extended position relative to the outer tube segment. Each of the corrugated members comprises a multiplicity of spacer blocks connected in series by a multiplicity of flexible beams. Bending of the flexible beams during compression of the spacer assemblies provides damping of the force produced upon impact when the inner tube segment drops relative to the outer tube segment, for instance, after the inner tube segment has been stuck and then slips relative to the outer tube segment.

12 Claims, 5 Drawing Sheets

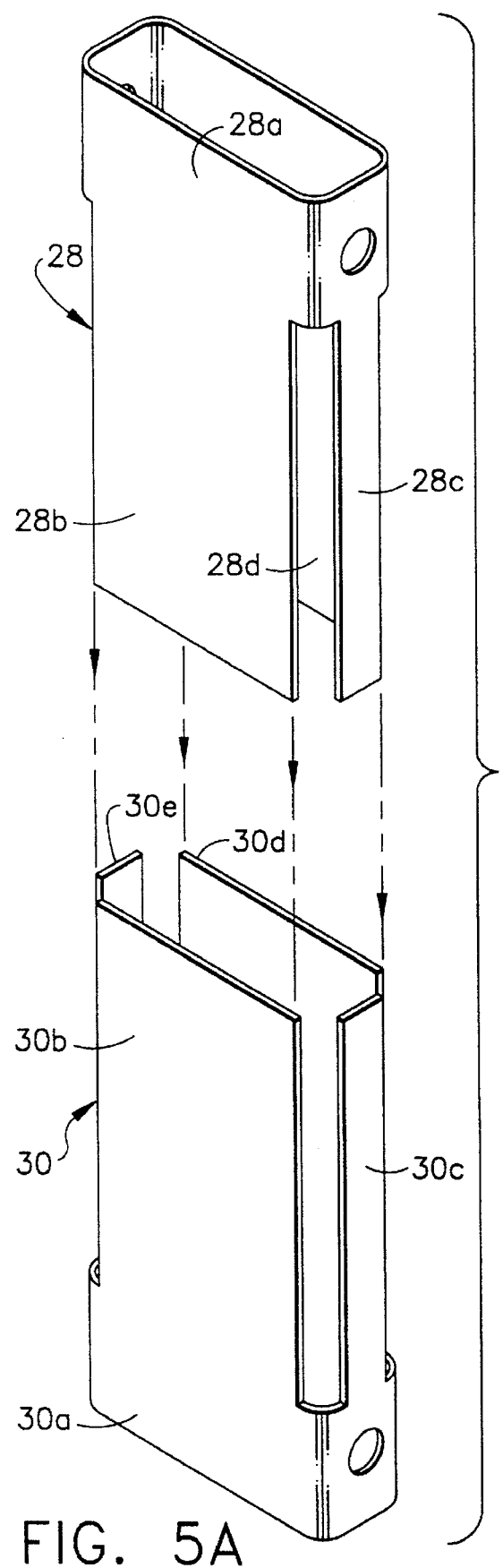
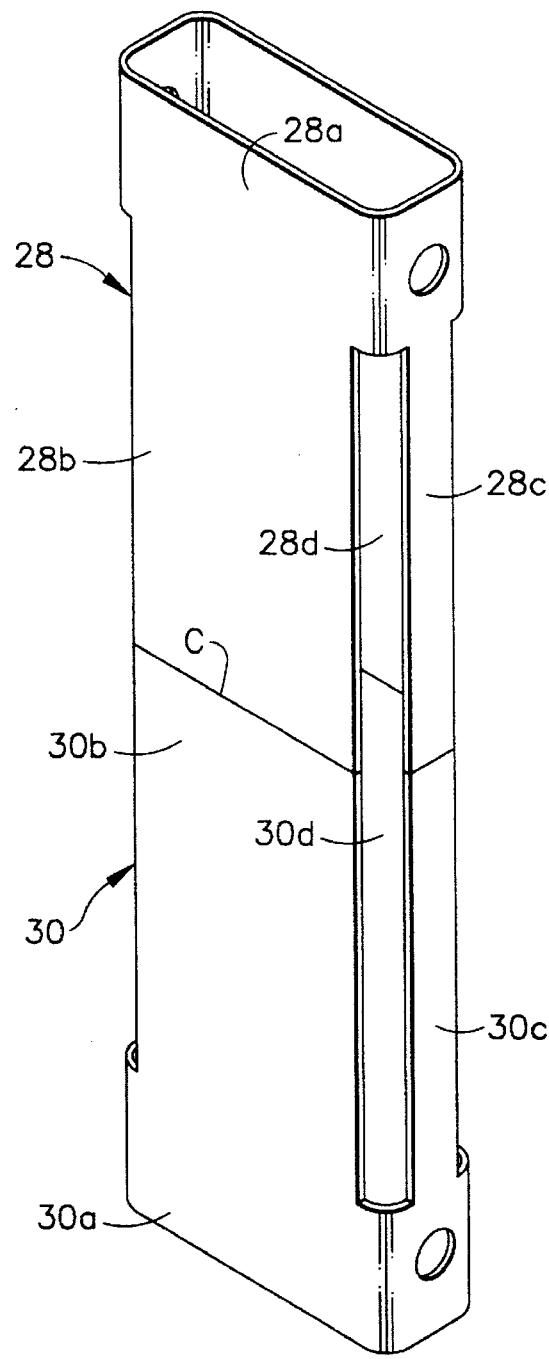
FIG. 5A
FIG. 5B

TELESCOPING MAST WITH ZERO CLEARANCE FOR REFUELING MACHINE

FIELD OF THE INVENTION

This invention relates generally to systems for refueling a reactor. In particular, the invention relates to telescoping masts suspended from a refueling bridge and having an end effector for grappling a component of the reactor fuel core and transporting it to the spent fuel pool.

BACKGROUND OF THE INVENTION

Typical refueling platforms consist of a rigid bridge crane type structure that travels on rails in the X direction between the reactor well and the spent fuel storage pool. A trolley, also a rigid structure, rides on rails on the bridge crane horizontal box section beams for motion in the Y direction. Located on the trolley are: 1) a telescoping mast and related equipment; 2) an auxiliary hoist with controls; and 3) a control station with displays. The refueling platform structure is of sufficient stiffness, the installation of the rails of sufficient accuracy, and a drive train of sufficient tightness to enable automatic grappling of the fuel based on coordinate sensors. The telescoping mast is attached to the trolley with gimbals. The mast consists of an outer heavy wall precision machined tube attached to the refueling machine at its top and four nested heavy wall precision machined tubes within. The mast has a rigidly positioned flanged adapter designed to accommodate several different end effectors. The mast extends in a manner similar to that of a telescope for a distance of about 17 m below the refueling floor.

Fuel assemblies can only be moved and replaced while the reactor is shut down. The cost of a reactor outage can be reduced by decreasing the time required for refueling. Since moving fuel is highly repetitive, it is an ideal target for automation. Although control systems for automation are readily available, refueling machines with their telescoping mast and grapple are not sufficiently free of lost motion to permit repeatable positioning accuracy and reliability needed for automation.

All current refueling machines utilize absolute positioning to achieve a predetermined repeatable Cartesian coordinate set in the horizontal (X-Y) plane. This concept has several undesirable characteristics and limitations, principally in relation to the cost of achieving the necessary position accuracy for a given depth of the fuel.

In absolute positioning, the position of the fuel in the core is assumed to have a fixed position relative to a corresponding position on the rail of the bridge or the rail of the trolley. Also a fixed invariant distance to the grapple and its intended final location is assumed. For this reason, the design must minimize deflection, minimize looseness in the mast, and eliminate lost motion in the drive trains. In a typical refueling machine with absolute positioning capability, the grapple X and Y coordinates are obtained from position indicators (typically optical digital encoders) located near the platform and trolley rails. The bridge and trolley are moved to the desired position and the mast with its grapple is lowered to the level of the fuel in the core. In this concept, deflections and clearances need to be minimized. Consequently, the bridge and trolley structures are designed to be very rigid and are therefore massive structures. Because of the large mass, a small amount of lost motion or stored energy in the drive train becomes a source of position error and it is difficult to eliminate this error source entirely. There is the inherent difficulty of precisely positioning a large mass. In addition, speed of travel becomes a problem from the standpoint of controlled nonlinear rapid acceleration and deceleration.

A separate problem is the fuel mast and grapple design. The conventional fuel mast is a series of nested tubes that extend by sliding relative to each other like a telescope. The mast must be very stiff and must be precisely machined to minimize the clearance between tubes. Consequently, the conventional mast is quite heavy. For a mast weighing 1070 kg, the estimated cable load (with fuel) is about 950 kg. For this weight, each cable must be about 9 mm in diameter and with a drum diameter of at least 405 mm (i.e., 45 times the cable diameter).

For the mast, the design challenge is to minimize clearances between the tubes and simultaneously assure smooth motion as the mast extends. If the bearing clearances are set too tight, the result is stick-slip, which is described as follows. As the mast is being extended, one of the sections is supported by the friction of the bearing and remains stuck in place. Later, as the mast continues its descent, the section breaks free and drops to the stops of the next larger mast section. Because this condition has been experienced in operating plants, the distance that a mast section may drop is limited by a load sensor that stops the descent of the mast if the full load of each mast section is not transferred as the mast is extended. Thus, the challenge is to provide a bearing design that never sticks but has zero clearance because bearing clearance introduces a non-repeatable position error.

SUMMARY OF THE INVENTION

The present invention is a telescoping mast with zero clearance which can be used in a fully automatic, relative positioning refueling machine. The telescoping mast consists of the following parts: a series of nested tubes made of a lightweight material such as aluminum or plastic; a spacer of unique design made of a plastic material such as polyethylene; a removable attachment to a pendent; a removable attachment to a robotic arm; and provisions for two hoist cables, a signal cable, a power and control cable, and an air hose. The number of moving mast elements may vary from three to ten, depending on the specific application requirements. The telescopic mast is extended or retracted by hoist cables having one end attached to the mast segment to which the pendent is mounted and another end attached to a cable drum with drive. The hoist cables together with air hose and control and signal cables are routed by means of pulleys to a drum, drive and drum control system located inside a robotic arm mount.

To be suitable for this application, the long nested tubes of the mast need to: 1) resist rotation, 2) restore to a position rapidly with no lost motion following movement, 3) extend and retract smoothly, and 4) have a minimum weight. The very lightweight tubes assure that the pendent cables remain in a single plane and provide resistance to rotation. The weight of the mast is estimated to be about ⅟10 of the weight of a conventional telescoping mast and does not require repeatable position accuracy. The telescoping mast in accordance with the invention only needs a predictable spring constant. Preferably, the upper end of the top segment of the telescoping mast is mounted to enable rotation of the mast about its longitudinal axis.

In accordance with the concept of the invention, a force at the ends of the tubes is required to assure the desired tube-to-tube stiffness and repeatability without preventing the smooth extension of the individual tubes in the telescoping assembly. This needed function is achieved by means of a unique spacer design. In particular, the spring must not relax during the projected life of the mast and highly reliable stops must be integrated in the design. To maintain a lightweight and compact design, the space between the tubes for the spacer is limited and must be able to accommodate reasonable manufacturing tolerances.

The unique spacer in accordance with the preferred embodiment of the present invention comprises an upper spacer assembly attached to the upper end of a first tube segment nested in a second tube segment and slidable inside the second tube segment; and a lower spacer assembly attached to the lower end of the second tube segment and slidable outside the first tube segment. The spacer assemblies are preferably made of molded plastic, for example, polyethylene. The upper and lower spacer assemblies maintain a predetermined spacing between the first and second tube segments during relative longitudinal displacement of those segments. The upper spacer assembly comprises an upper spacer ring and a plurality of corrugated members connected at one end to the upper spacer ring and extending downward, and the lower spacer assembly comprises a lower spacer ring and a plurality of corrugated members connected at one end to the lower spacer ring and extending upward. The distal ends of the corrugated members of the upper spacer assembly contact distal ends of respective ones of the corrugated members of the lower spacer assembly when the first tube segment is in an extended position relative to the second tube segment. Each of the corrugated members comprises a multiplicity of spacer blocks connected in series by a multiplicity of flexible beams. Bending of the flexible beams during compression of the spacer assemblies provides damping of the force produced upon impact when the first tube segment drops relative to the second tube segment, for instance, after the first tube segment has been stuck and then slips relative to the second tube segment. Analysis indicates that the spacer design of the instant invention will result in an acceptable life with adequate margin.

BRIEF DESCRIPTION OF THE DRAWINGS

FIGS. 5A and 5B are isometric views of the spacer assembly in accordance with a preferred embodiment of the invention, showing the spacer positions with the mast retracted (FIG. 5A) and extended (FIG. 5B).

DETAILED DESCRIPTION OF THE PREFERRED EMBODIMENTS

Figures 1, 2:
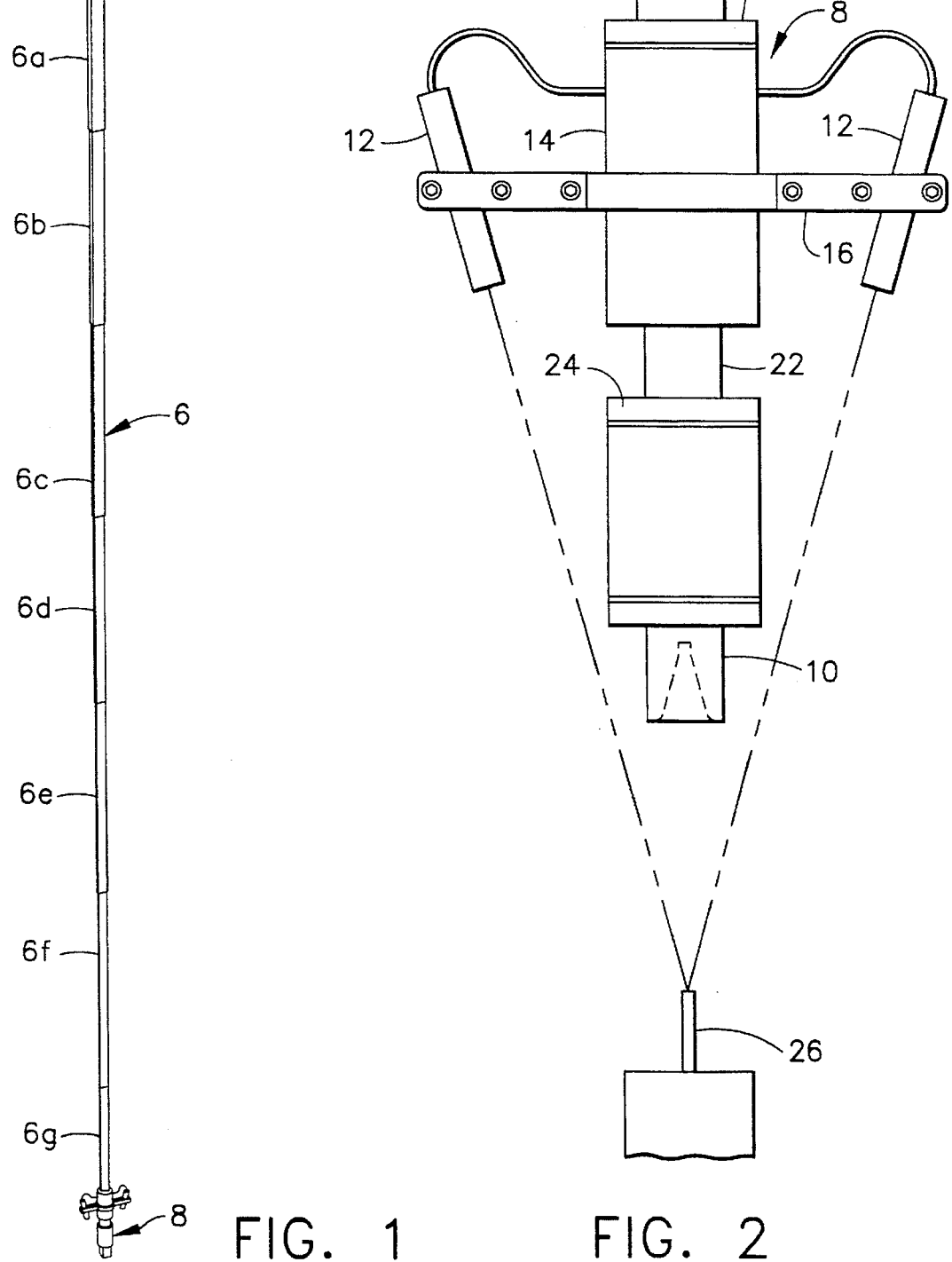
FIG. 1 is an isometric view of a six-element mast attached to a robotic arm in accordance with one preferred embodiment of the invention.
FIG. 2 is a side view of a pendent for grappling fuel bundle assemblies which can attached to the lower end of the telescoping mast of the present invention.

As shown in FIG. 1, the main elements of a relative positioning refueling machine are a moving support structure 2, a two-segment robotic arm 4 having one end connected to the moving support structure, a telescoping mast 6 mounted on the other end of the robotic arm, and a pendent 8 mounted on the bottom end of the mast. Each segment 4a and 4b of robotic arm 4 is independently pivotable about a respective vertical axis through a predetermined arc, such pivoting being driven by conventional drive motors and gearing (not shown).

A topmost mast segment 6a is attached via a gimbal mounting (not shown) to the distal end of arm 4b. The gimbal mounting allows rotation of mast segment 6a about its own longitudinal axis. Mast segment 6a is fixed in the sense that it cannot translate relative to the arm segment 4b. The mast 6 further comprises a plurality of nested mast segments which are slidable relative to each other and relative to fixed mast segment 6a. FIG. 1, depicts a telescoping mast having six slidable mast segments 6b–6g. However, the number of slidable mast segments may be varied between three and ten depending on the design requirements for a specific application.

The innermost nested mast segment 6g is secured to the ends of a pair of hoist cable and carries the pendent 8. Pendent 8 incorporates cameras and ultrasonic transducers for recognizing its current position relative to the position required to grapple the handle of a fuel bundle assembly. The position information is relayed to the control system for the robotic arm. The arm 4 positions the end effector (fuel grapple) over the fuel to be moved and the control system rotates the end effector to the correct angle. The control system grapples the fuel and automatically moves the fuel to a new location.

The pendent 8, shown in more detail in FIG. 2, is a carrier of various end effectors, e.g., a fuel grapple 10, and provides position information to control the location of the robotic arm. To improve performance and reduce cost, the pendent incorporates the following features: compact underwater cameras 12 with lights and ultrasonic transducers (not shown) for position verification and collision avoidance. The cameras can be mounted externally on a cylindrical body 14 of pendent 8 using holders 16. Two pairs of thrusters (not shown), mounted on the pendent perpendicular to each other, provide fine motion position control in the X-Y plane.

Figure 3:
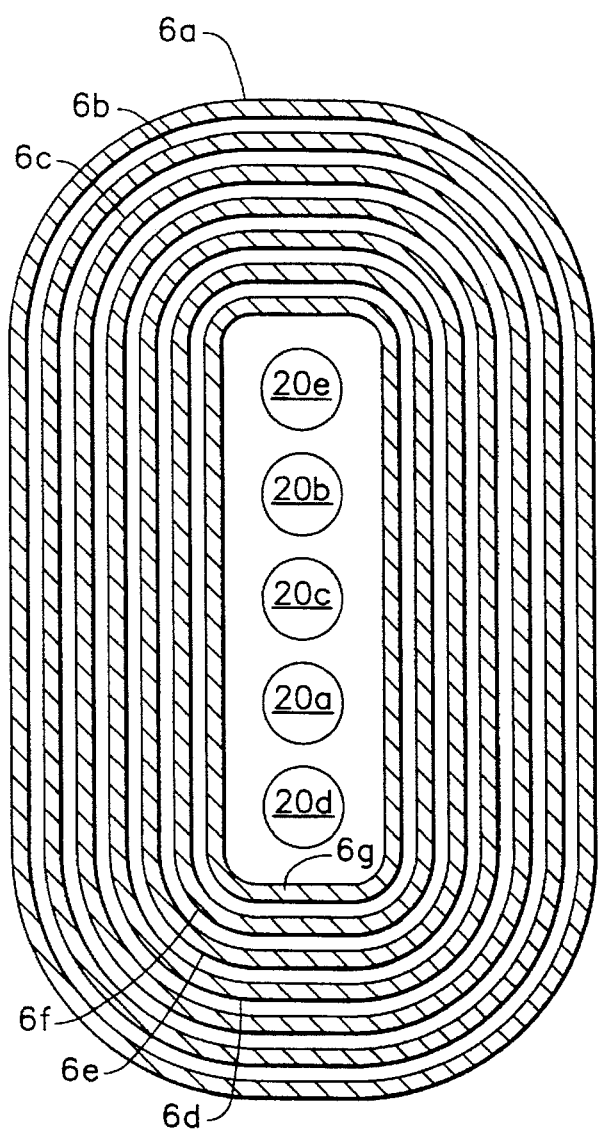
FIG. 3 is a horizontal cross-sectional view of the six-element telescoping mast shown in FIG. 1.

The thrusters are utilized in the position control scheme, as follows. The pendent and its load are supported by two wire ropes or hoist cables 20a and 20b (see FIG. 3) attached to the innermost mast segment. Each hoist cable is designed to carry the full load of the device. The weight of the pendent is sufficient to cause the lightweight telescoping mast 4 to hang in a vertical position. The mast 6 acts as a shroud for the support cables 20a, 20b, the air supply hose 20c for actuating the fuel grapple 10, the signal cable 20d and the power and control cable 20e, as shown in FIG. 3.

With this arrangement, the robotic arm 4 (see FIG. 1) and platform control system (not shown) provide the needed high-speed gross positioning of the pendent for grappling and moving fuel. The gross positioning is expected to be accurate to within ±100 mm utilizing computer-resident position tables. After reaching the gross position, the platform structure (not shown), and mount 2 supported thereon, is temporarily locked in place. Then, as the pendent is being lowered, the cameras provide the imaging necessary for software to determine the location of the pendent relative to the position required for grappling the fuel (or other core components). In this phase, position control is passed to a machine vision component of the control system. This intermediate positioning process is expected to be accurate to within about ±10 mm at a distance ranging from 4000 to 1000 mm above the level of the fuel bail to be grappled. The speed of descent of the pendent is gradually reduced and the thrusters position the pendent within about ±2 mm of the true position for grappling at distance ranging from 1000 to 100 mm above the fuel bail. The telescoping mast 6 is sufficiently flexible to permit an initial 20 mm motion. However, as the pendent 8 is slowly lowered the last 1000 mm, the robotic arm 4 is then moved at the level of the top of the mast to the exact X-Y position above the pendent while the pendent's position is maintained by the thrusters.

Angular position is easily achieved at the top of the telescoping mast 6 and the thrusters are used, as described above, to assure fine motion position control. The use of thrusters makes possible a very light flexible plastic telescoping mast design which is used only as a guide for the support cables and pendent umbilical cords.

The pendent 8 has a cylinder 22 with a flange 24 for attaching the end effector, e.g., a fuel grapple 10 or a control rod grapple (not shown). The cylinder 22, which extends inside the pendent housing, is optionally designed to rotate about 360° with angular position control, in which case the telescopic mast segment 6a need not be rotatable about its longitudinal axis. The flanged cylinder 22 is also spring loaded in the vertical axis to prevent transmission to the mast of the full force produced when the fuel grapple 10 impacts the handle 26 of the fuel bundle assembly 28. The mast 6 comprises a removable attachment 6h (see FIG. 2) to the pendent 8 and a removable attachment (not shown) to the robotic arm 4.

Since the telescoping mast in accordance with the concept of the present invention is not an essential element of positioning, it has been conceived as a very light relatively flexible set of nested tubes, including fixed tube 6a and moving tubes 6b–6g (see FIG. 1). However, for any design of this type, the number of tubes needed depends on the retracted length, the overlap between tubes and the extended length. The level of flexibility and position repeatability when retracting and extending the tubes depends on tube straightness, clearance between the tubes, overlap and spacer design. More tubes generally means a greater vulnerability to manufacturing tolerances of the individual tubes, length of the overlap and the spacer design for a given position accuracy. This vulnerability was particularly important for conventional designs (the system used in most currently operating reactors) in which overall position accuracy is directly dependent on the accuracy of the telescoping mast. The consequence of this dependence was a very expensive, very heavy, accurately machined set of nested stainless steel tubes.

The mast should not inhibit the ability of the pendent to define its correct location over the fuel to be grappled and to be positioned by the robotic arm from above. This suggests that the mast need not be stiff but it should have a relatively fixed spring constant, i.e. it should have very little lost motion as it is extended or retracted. Although some lost motion could be accepted, excessive looseness could result in hunting which would be an unwelcome time delay in grappling fuel. With the addition of thrusters to the pendent, the stiffness requirements for the telescoping tubes becomes a minor consideration. Nevertheless, fewer tubes in the telescoping mast is desirable because the assembly has fewer parts, is lighter and less expensive. The reduced weight of each mast segment eliminates the concern for a mast segment being dropped.

Figure 4:
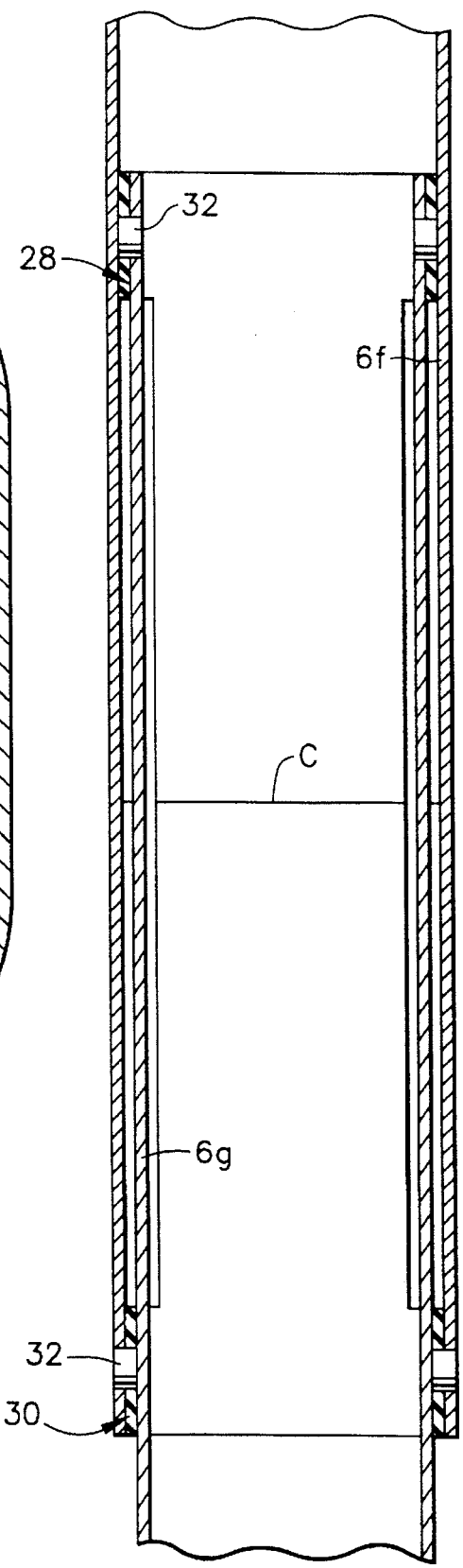
FIG. 4 is a vertical cross-sectional view of the joint of the lowest two nested tubes of a telescoping mast in accordance with the present invention, showing the location of the spacer.

A vertical cross section of the joint of the two lowest nested mast segments 6f and 6g having a spacer in accordance with the preferred embodiment of the instant is shown in FIG. 4. It should be understood that the joint of each pair of nested mast segments has a similar spacer arrangement. Each mast segment is a cylindrical tube having a cross-sectional shape similar to a rectangle with rounded corners. Other shapes, such as an ellipse, could also be used. The spacer assemblies 28 and 30 are located between the tube elements 6f and 6g at the joint thereof. The upper spacer assembly 28 is attached to the top of tube element 6g and extends downward between tube elements 6f and 6g; the lower spacer assembly 30 is attached to the bottom of tube 6f and extends upward between the tube elements. The spacer assemblies 28 and 30 in conjunction act as a tube guide, as a damper if the tube element 6g sticks and subsequently drops, and as a stop for downward displacement of tube element 6g relative to tube element 6f. The location of the spacer assemblies is shown in FIG. 4, but the structure of the spacer assemblies is not shown in detail.

A three-dimensional sketch of the spacer assemblies is shown in FIGS. 5A and 5B. For reasons of clarity, the spacer corrugations are not shown in these drawings. The spacers are located in the space between each pair of nested tubes. As seen in FIGS. 5A and 5B, the upper spacer assembly 28 is attached to the outside of an inner tube segment 6g nested in an outer tube segment 6f and is slidable inside the outer tube segment 6f; the lower spacer assembly 30 is attached to the inside of the outer tube segment 6f and is slidable outside the nested inner tube segment 6g. The spacer assemblies 28 and 30 are preferably made of molded plastic, for example, polyethylene. The upper and lower spacer assemblies maintain a predetermined spacing between the inner and outer tube segments 6f and 6g during relative longitudinal displacement of those segments. FIG. 5A shows the relative spacer positions when the mast is retracted; FIG. 5B shows the relative spacer positions when the mast is extended.

The upper spacer assembly 28 comprises an upper spacer ring 28a and a plurality of flexible members 28b–28e connected at one end to the upper spacer ring 28a and extending downward. Similarly, the lower spacer assembly 30 comprises a lower spacer ring 30a and a plurality of flexible members 30b–30e connected at one end to the lower spacer ring 30 and extending upward. The upper spacer ring 28a is used to attach the upper spacer assembly to the upper end of the inner telescoping tube, e.g., tube segment 6g (see FIG. 4). The lower spacer ring 30a is used to attach lower spacer assembly 30 to the bottom end of the next larger telescoping tube, e.g., tube segment 6f. Between each successively larger tube is an upper spacer assembly and a lower spacer assembly. Thus, for the six-segment mast shown in FIG. 1, there are a total of 12 spacer assemblies.

Figure 6:
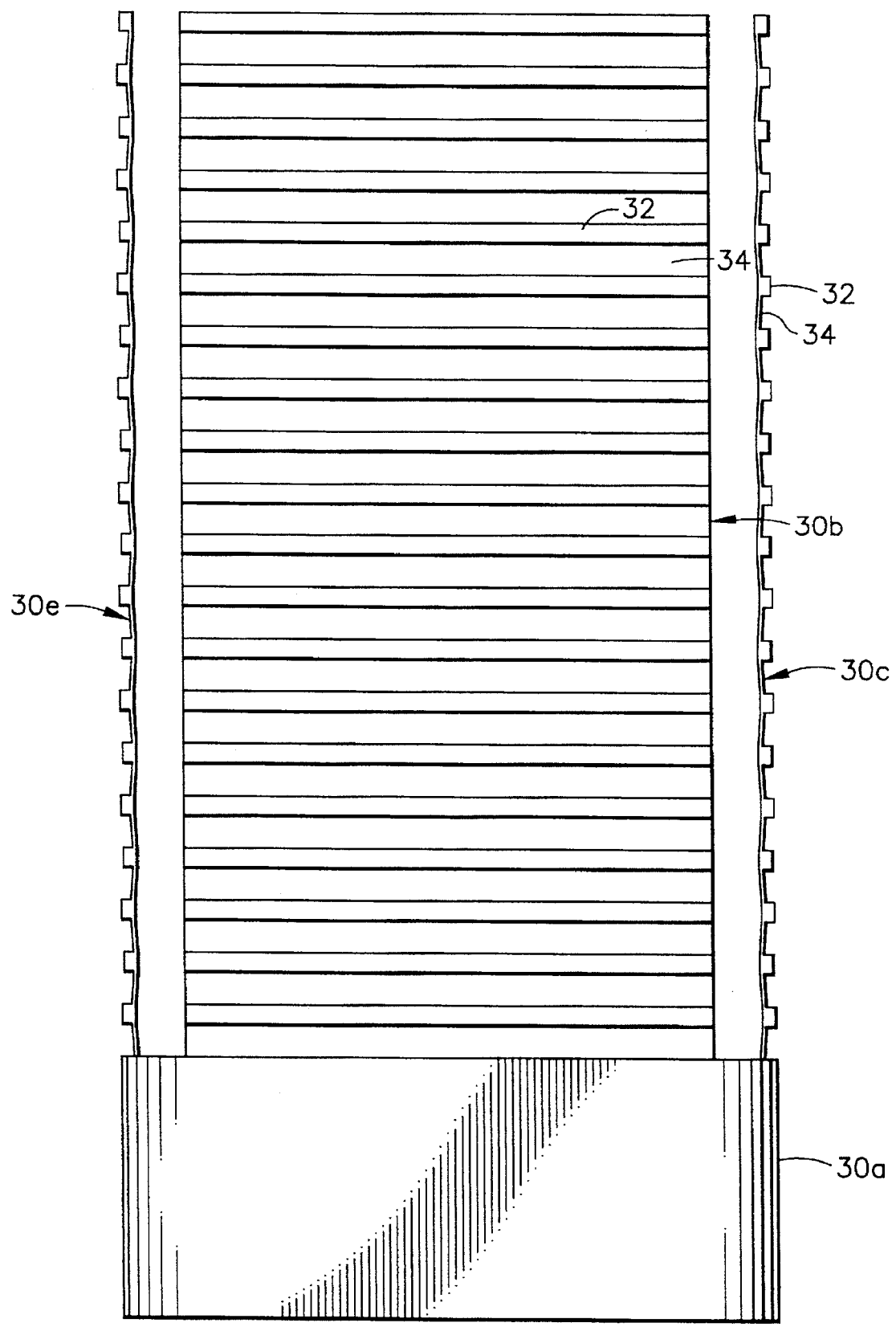
FIG. 6 is a front view of a spacer assembly in accordance with one preferred embodiment of the invention.

Each of the flexible members 28b–28e and 30b–30e comprises a multiplicity of corrugations, shown in detail in FIG. 6. In accordance with a preferred embodiment, each corrugated flexible member comprises a multiplicity of generally parallel elongated spacer blocks 32 connected in series by a multiplicity of flexible beams 34. Each block 32 has a rectangular cross section having a width equal to the width of the spacer rings 28a and 30a, which width is equal to the desired spacing between adjacent nested tube segments. The distal ends of flexible members 28b–28e of upper spacer assembly 28 contact the corresponding distal ends of respective ones of flexible members 30b–30e of lower spacer assembly 30 at contact plane C, for example, when tube segment 6g is in an extended position relative to tube segment 6f, as shown in FIG. 4. Bending of the flexible beams 34 during compression of the spacer assemblies provides damping of the force produced upon impact when one tube segment drops relative to the next larger tube segment in which the one tube segment is nested. This can occur after the one tube segment has been stuck and then slips relative to the next larger tube segment. To facilitate bending of beams 34 in response to compression of the corrugated members in a longitudinal direction, the beams 34 are connected to the rectangular blocks 32 at a slight oblique angle relative to the blocks. One side of each block contacts the inner wall surface of the outer telescoping tube and the other side contacts the outer wall surface of the inner telescoping tube. By selecting the beam thickness and distance between the blocks, an optimum force between the telescoping tube segments can be developed.

Figure 7:
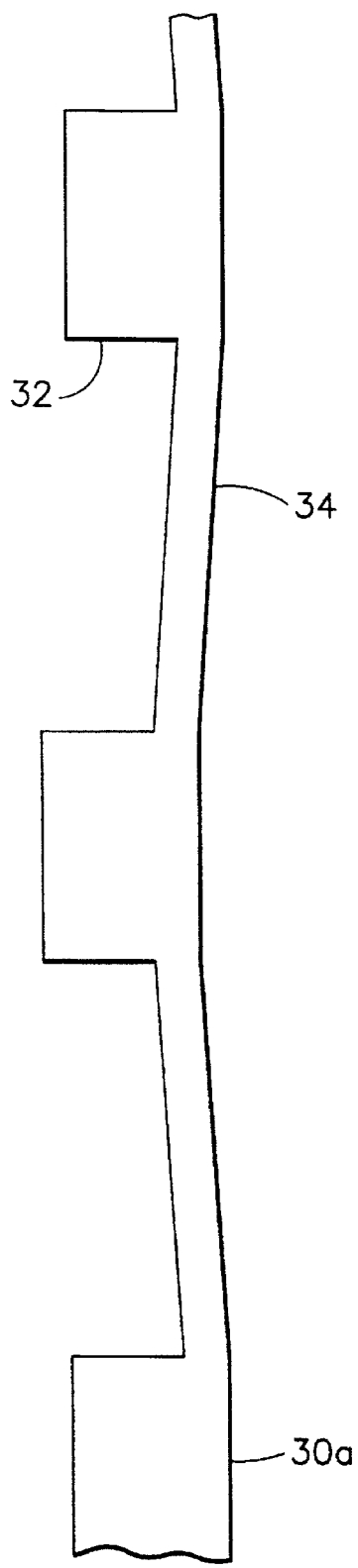
FIG. 7 is a side view showing the block-beam configuration of the spacer corrugations shown in FIG. 6.

The block-beam configuration of FIG. 6 is shown in more detail in FIG. 7. Due to the limited contact area, equal to the sum of individual contact surfaces of the blocks 32, a sufficient force between the telescoping tubes is developed without causing a frictional force greater than the weight of the tube. Thus, the tube extends smoothly. If, however a tube sticks and subsequently drops, causing the upper spacer assembly to contact the lower spacer assembly with excessive force, the angled beams deflect. The resistance to deflection of the resilient plastic material of the beams produces a countervailing damping force, whereby the impact load is minimized. The spacer ring attachment shown in FIG. 4 is designed to accommodate a tube drop from the maximum height without damage to the assembly.

Figure 8:
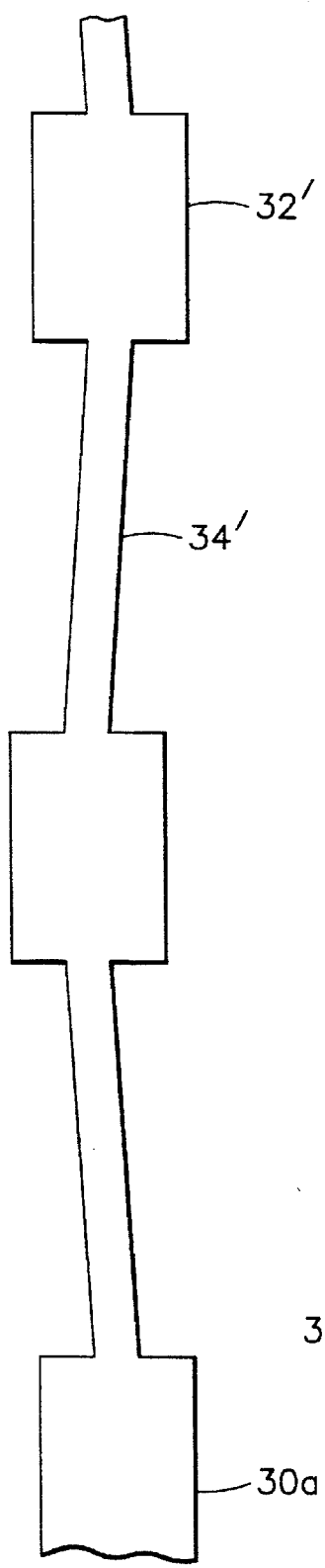
FIGS. 8 and 9 are side views showing block-beam configurations for spacer corrugations in accordance with alternative embodiments of the invention.
Figure 9:
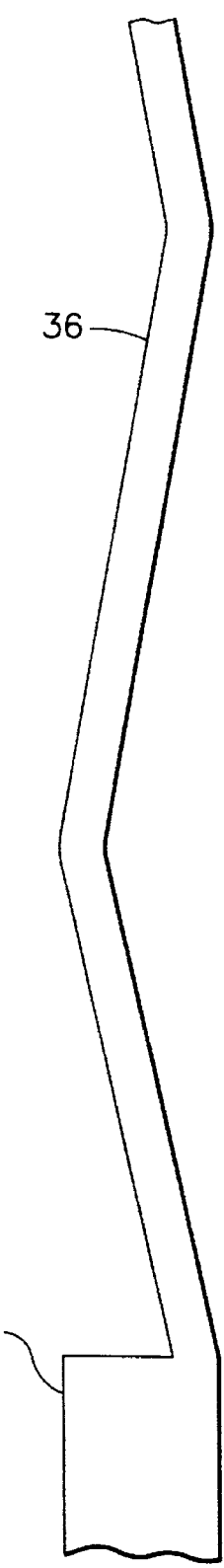

Several variations of the block-beam concept may be used. Two such variations are shown in FIGS. 8 and 9. The corrugated member of FIG. 8 comprises a multiplicity of generally parallel elongated spacer blocks 32' connected in series by a multiplicity of flexible beams 34'. In contrast to the corrugated member of FIG. 7, the beams 34' in the corrugated member of FIG. 8 are joined to blocks 32' at the midsections thereof. In contrast, the corrugated member of FIG. 9 consists of a series of beams 36 connected in a zigzag pattern without intermediate spacer blocks.

A range of telescoping tube assembly designs fall within the scope of the present invention. The two extremes are one with as many as ten moving sections and one static section to one with as few as three moving sections and one static section. Aluminum and plastics are suitable for use as materials of construction. One preferred embodiment is a three-moving-section mast in which the tubes and spacers are constructed of polyethylene. Another preferred embodiment has a series of nested aluminum tubes separated by polyethylene spacers.

The foregoing preferred embodiments have been disclosed for the purpose of illustration. Other variations and modifications will be apparent to persons skilled in the design of passive pressure suppression systems. For example, it will be apparent that the geometry of the corrugated members can be varied from the specific configurations shown in FIGS. 7–9. The cross section of the spacer blocks need not be rectangular. Also, the beam pattern can be other than zigzag, e.g., undulating. All such variations and modifications are intended to be encompassed by the claims hereinafter.

We claim:

1. A telescoping mast comprising:
   first and second cylindrical tube segments, said first tube seqment being fittable inside said second tube segment;
   an upper spacer asse.bly attached to the outside of said first tube segment and slidable inside said second tube segemnt; and
   a lower spacer assembly attached to the inside of said second tube segment and slidable outside said first tube segment, said upper and lower spacer assemblies maintaining a predetermined spacing between said first and second tube segments during relative longitudinal displacement of said first and second tube segments,
   wherein said spacer assembly comprises an upper spacer ring which surrounds said first tube segment and a plurality of corrugated members connected at one end to said upper spacer ring and extending downward between said first and second tube segments, and said lower spacer assembly comprises a lower spacer ring which surrounds said first tube segemnt and a plurality of corrugated members connected at one end to said lower spacer ring and extending upward between said first and second tube segments, said corrugated members having corrugations which extend generally transverse to a direction of relative sliding of said first and second tube segments.

2. The telescoping mast as defined in claim 1, wherein distal ends of said corrugated members of said upper spacer assembly contact distal ends of respective ones of said corrugated members of said lower spacer assembly when said first tube segment is in an extended position relative to said second tube segment.

3. The telescoping mast as defined in claim 1, wherein each of said corrugated members comprises a multiplicity of spacer blocks connected in series by a multiplicity of flexible beams.

4. The telescoping mast as defined in claim 3, wherein each of the spacer blocks of a given corrugated member have a predetermined width.

5. The telescoping mast as defined in claim 3, wherein the beams of a given corrugated member are not coplanar when said given corrugated member is in an unflexed state.

6. The telescoping mast as defined in claim 1, wherein each of said corrugated members comprises a multiplicity of flexible beams connected in series, the beams of a given corrugated member being not coplanar when said given corrugated member is in an unflexed state.

7. The telescoping mast as defined in claim 6, wherein the beams of said given corrugated member are arranged in a zigzag pattern.

8. A telescoping mast comprising:
   first and second tube segments, said first tube segment being fittab;e inside said second tube segment;
   an upper spacer assembly attached tp the outside of said first tube segment and slidab;e inside said second tube segment; and
   a lower spacer assembly attaced to the inside of said second tue segment and slidable outside said first tube segment, said upper and lower spacer assemblies maintaining a predetermined spacing between said first and second tube segment during relative longitudinal displacement of said first and second tube segments,
   wherein said upper spacer comprises an upper spacer ring and a plurality of resilient members connected at one end to said upper spacer ring and extending downward, and said lower spacer assembly comprises a lower spacer ring and a plurality of resilient members connected at one end to said lower spacer ring and extending upward, distal ends of said resilient memebers of said upper spacer assembly contacting distal ends of respective ones of said resilent members of said lower spacer assembly when said first tube segment is in an extended position relative to said second tube segment, said resilient members being compressed in response to an impact caused by said first tube segment dropping a predetermined height relative to said second tube segment, whereby said impact is damped, amd each of said resilent members comprises a multiplicity of spacer blocks connected in series by a multiplicity of flexible beams.

9. The telescoping mast as defined in claim 8, wherein each of the spacer blocks of a given resilient member have a predetermined width.

10. The telescoping mast as defined in claim 8, wherein the beams of a given resilient member are not coplanar when said given resilient member is in an unflexed state.

11. A telescoping mast comprising:

first and second tube segments, said first tube segment being fittable inside said second tube segment;

an upper spacer assembly attached to the outside of said first tube segment and slidable inside said second tube segment; and a lower spacer assembly attached to the inside of said second tube segement and slidable outside said first tube segment, said upper and lower spacer assemblies maintaining a predetermined spacing between said first and second tube segments during relative longitudinal displacement of said first and second tube segments;

wherein said upper spacer assembly comprises an upper spacer ring and a plurality of resilient members connected at one end to said upper spacer ring and extending downward, and said lower spacer assembly comprises a lower spacer ring and a plurality of resilient members connected at one end to said lower spacer ring and extending upward, distal ends of said resilient members of said upper spacer assembly contacting distal ends of respective ones of said resilient members of said lower spacer assembly when said first tube segment is in an extended position relative to said second tube segment, said resilient members being compressed in response to an impact caused by said first tube segment droppom a predetermined height relative to said second tube segment, whereby said impact is damped, and each of said resilient members comprises a multiplicity of flexible beams connected in series, the beams of a given resilient member being not coplanar when said given resilient member is in an unflexed state.

12. The telescoping mast as defined in claim 11, wherein the beams of said given resilient member are arranged in a zigzag pattern.

* * * * *